United States Patent Office 2,710,162
Patented June 7, 1955

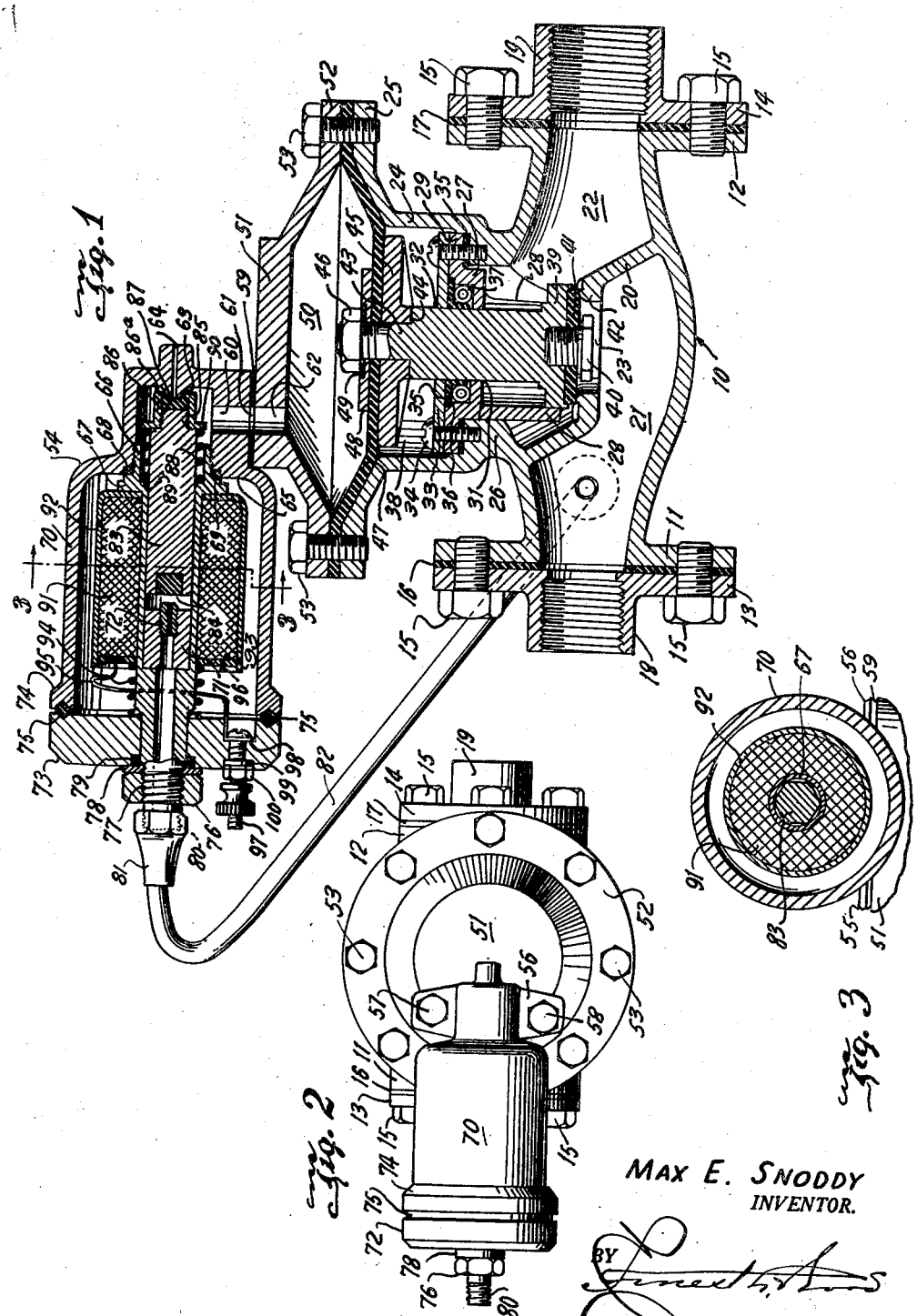

2,710,162

PRESSURE RESPONSIVE DIAPHRAGM OPERATED VALVE

Max E. Snoddy, Dallas, Tex.

Application June 5, 1950, Serial No. 166,105

1 Claim. (Cl. 251—61)

This invention relates to fluid flow control valves and more particularly to fluid flow control valves which are electro-magnetically controlled.

This application is a continuation in part of my copending applications Serial No. 75,003, filed February 7, 1949, and Serial No. 754,810, filed June 16, 1947, both now abandoned, and discloses a new and improved form of the electro-magnetically controlled fluid flow control valve described in the copending applications.

Accordingly, it is an object of the present invention to provide a new fluid flow control valve.

It is another object of the invention to provide a new and improved electro-magnetically controlled fluid flow control valve.

It is another object of the invention to provide a new and improved fluid control valve in which the pressure of the fluid exerted on one side of a resilient diaphragm normally maintains the control valve closed to prevent passage of fluid therethrough and in which the pressure of the fluid exerted on a valve secured to the diaphragm maintains the control valve open to allow flow of fluid therethrough when the pressure of the fluid on the one side of the diaphragm is released by the actuation of a solenoid plunger.

Briefly stated, the new and improved fluid flow control valve comprises a body having two chambers which are separated by a partition. A valve secured to a diaphragm is adapted to close or open an orifice in the partition when the pressure of the fluid of a fluid supply line is selectively and directly applied to or released from one side of the diaphragm upon the actuation of a solenoid valve. The pressure of the fluid is applied indirectly to the other side of the diaphragm through the valve secured to the diaphragm. When open, the solenoid actuated valve allows the pressure of the fluid of the supply line to be directly applied to the one side of the diaphragm to move the valve secured to the diaphragm upon the orifice to prevent flow of fluid from the supply line through one of the chambers into the other of the two chambers. A solenoid, when energized, moves a plunger to close the solenoid actuated valve and simultaneously open a relief valve in order to remove the pressure of the fluid from the one side of the diaphragm and allow the pressure of the fluid of the supply line acting indirectly on the other side of the diaphragm through the valve secured to the diaphragm to move the valve secured to the diaphragm and open the orifice to allow the flow of fluid from one of the chambers to the other through the orifice.

For a better understanding of the invention reference is made to the following description taken in connection with the accompanying drawing and its scope will be pointed out in the appended claim.

In the drawing:

Figure 1 is a vertical sectional view of a preferred embodiment of the valve of the invention;

Figure 2 is a reduced top plan view of the valve shown in Figure 1; and,

Figure 3 is a reduced sectional view taken along line 3—3 of Figure 1.

Referring now to the drawing, the preferred embodiment of the valve of my invention comprises a hollow valve body 10 on opposite ends of which are flanges 11 and 12. The flanges 11 and 12 are adapted to be connected to flanges 13 and 14, respectively, by means of bolts 15. Gaskets 16 and 17 are interposed between flanges 11 and 13, and 12 and 14, respectively, in order to maintain fluid tight connections between the flanges. Flange 13 is provided with an integral internally threaded sleeve 18 by means of which valve body 10 may be connected to a fluid supply line, not shown. Flange 14 is similarly provided with an integral internally threaded sleeve 19 by means of which body 10 may be connected to a fluid line in which the flow of fluid may be controlled by means of the valve of the invention.

Valve body 10 is provided with a partition 20 which divides valve body 10 into chambers 21 and 22. Partition 20 is provided with an aperture 23 which connects chambers 21 and 22 and which allows fluid to pass from the fluid supply line past sleeve 18 and to the fluid line which may be connected to sleeve 19. Main body 10 is also provided with an integral substantially cylindrical body 24 having an outwardly extending flange 25 and an inwardly extending flange 26. A valve stem guide 27 having three depending legs 28, two of which are visible in Figure 1, and an annular flange 29 is disposed in cylindrical body 24. Annular flanges 29 of valve guide 27 is also provided with a central aperture 31 through which passes the valve stem 32. An annular plate 33 having a central aperture through which passes the valve stem rests on flange 29. Plate 33 and valve stem guide 27 are secured to cylindrical body 24 by means of screws 34 which pass through suitable registering apertures in plate 33 and flange 29 into threaded bores in flange 26 of cylindrical body 24. A leather washer 35 embraces valve stem 32 and is held on a ledge 36 of valve stem guide 27 by plate 33 and against valve stem 32 by a garter spring 37. Washer 35 prevents the flow of fluid from chamber 22 past valve stem 32 and into a chamber 38.

Valve stem 32 is provided at its lower end with an enlarged head 39 whose outer periphery abuts and lies between legs 28 and to whose lower surface is secured by means of a screw 40 a leather or rubber washer 41. The washer 41 bears against an annular shoulder 42 which encircles the orifice 23 in partition 20 and prevent flow of fluid from chamber 21 to chamber 22 when valve stem 32 is in the lower position illustrated in Figure 1. The upper end 43 of valve stem 32 is reduced to form a ledge 44 upon which is seated an aperture disc 45. The disc 45 is provided with a central aperture through which passes the upper end 43 which is threaded to engage a nut 46. Disc 45 abuts and is secured to the central portion of a diaphragm 47 made of rubber or other suitable flexible material by means of a washer 48 which may be brass and a sealing washer 49 which may be of lead. When nut 46 is tightened on upper end 43 of valve stem 32, the lead washer 49 is compressed and fills the threads preventing leakage of fluid from chamber 50 to chamber 38.

A cover 51 having a circular flange 52 of the same diameter as flange 25 rests upon the outer edge of diaphragm 47 which in turn rest upon flange 25. Bolts 53 pass through registering holes in flange 50 and diaphragm 47 and engage threaded apertures in flange 25 to secure cover 51 and diaphragm 47 in fluid tight relation to flange 25.

A solenoid housing 54 has oppositely extending lugs 55 and 56 through which pass bolts 57 and 58, respectively, into suitable threaded bores in cover 51, not shown, to secure solenoid housing 54 to cover 51. A gasket 59 of rubber or other suitable material is interposed between housing 54 and cover 51 to prevent leakage of fluid. Housing 54, gasket 59 and cover 51 are provided with registering apertures 60, 61 and 62 to provide a passage for fluid from the interior of housing 54 and the chamber 50 formed by diaphragm 47 and cover 51. Housing 54 is provided at one end with an inwardly extending shoulder which forms a valve seat 63 and which is provided with a relief outlet 64.

The narrow end of housing 54 is threaded interiorly adjacent an annular shoulder 65 to engage the exteriorly threaded reduced end 66 of a hollow sleeve 67. A gasket 68 of lead or other suitable material is interposed between shoulder 65 of housing 54 and the shoulder 69 of hollow sleeve 67 to prevent the flow of fluid into the chamber formed by hollow sleeve 67 and the main portion 70 of housing 54.

Rigidly secured within hollow sleeve 67 by press fit is a hollow plug 71 of magnetic material, such as stainless steel having internal threads which engage the exterior threads of a valve seat 72 which is rigidly secured to hollow plug 71 and has a central aperture communicating with the aperture of plug 71. Hollow sleeve 67 has a reduced end which passes through a central aperture in a cover 73. Cover 73 may be of plastic or other non-conductive material. Cover 73 and the flange 74 of housing 54 are provided with aligned grooves in which an O ring 75 of rubber or other elastic material is seated. Cover 73 is rigidly fastened to housing 54 by means of a nut 76 which engages the threads 77 on the hollow sleeve 67 and presses a washer 78 against cover 73 and against an O ring 79 which is inserted in a recess in cover 73. Ring 79 is pressed against the outer surface of hollow sleeve 67 to form a fluid tight seal. The external reduced end 80 of hollow sleeve is exteriorly threaded to engage the internally threaded fitting 81 of a pressure tube 82 which is secured to body 10 by any suitable means and which communicates with chamber 21 of body 10.

A hexagonal valve stem or plunger 83 of magnetic material, such as stainless steel, is slidably secured in hollow sleeve 67 for reciprocatory motion toward and away from cover 73. Since plunger 83 is hexagonal, the spaces between the sides of plunger 83 and the internal surface of hollow sleeve 67 permit passage of fluid from chamber 21 through tube 82, plug 71, valve seat 72 and apertures 60, 61 and 62 to chamber 50. One end of plunger 83 is provided with a recess into which is pressed a pad 84 of rubber or other elastic material which presses against valve seat 72 when plunger 83 is moved toward cover 73 and prevents the flow of fluid from chamber 21 to chamber 50. The other end of plunger 83 is reduced and threaded as at 85 to engage an interiorly threaded cap 86 which is provided with an inwardly extending flange 86a which holds a pad 87 against the reduced end of plunger 83. Pad 87 bears against valve seat 63 and closes relief outlet 64 when plunger 83 is in the position illustrated in Figure 1.

Plunger 83 is yieldingly urged to the position shown in Figure 1 by spring 88 one of whose ends bears against an annular ledge 89 of hollow sleeve 67 and the other of whose ends bears against an outwardly extending flange 90 of cap 86. In order to move plunger 83 to the position in which pad 84 bears against valve seat 72, there is provided a coil 91 which is disposed on hollow sleeve 67 and which is provided with a case 92 of magnetic and electrically conductive material such as steel. The end of case 92 nearest cover 73 is closed by a washer 93 of electrically conductive material such as steel. A spring 94 is provided to maintain the end of case 92 furthest from cover 73 in close contact with the shoulder 69 of hollow sleeve 67 in order to insure a good electrical contact between these components. Spring 94 bears against cover 73 and washer 93. Washer 93 is provided with a pair of apertures through which are brought out the terminal wires 95 and 96 of coil 91. Insulated terminal wire 95 is secured to the terminal post screw 97 by means of a lug 98. Post screw 97 passes through an aperture in cover 73 which is made fluid tight by a lead washer 99 which is seated in a recess in cover 73 and which is compressed by a nut 100 to fill in the threads of screw 97. Lead 96 is connected to case 92 and is grounded through case 92 and hollow sleeve 67 to housing 54.

In operation, plunger 83 and valve stem 32 are normally in the positions illustrated in Figure 1. Chamber 50 is filled with fluid under pressure from the fluid supply line and chamber 21 since valve seat 72 is not closed by pad 84 and since relief outlet 64 is closed by pad 87. The pressure exerted on valve stem 32 through washer 41 by the fluid in chamber 21 is overbalanced by force of pressure exerted on valve stem 32 by the fluid in chamber 50 because of the greater area of diaphragm 47, both chambers being in communication with the supply line which supplies fluid under pressure. When coil 91 is energized by current supplied from any appropriate source to terminal post 97, the other side of the source being connected through ground to terminal 96, coil 91 sets up a magnetic field the flux of which is transmitted to plunger 83 through magnetized plug 71 thus urging plunger 83 to move toward cover 73 against the resistance of spring 88 since plunger 83 and plug 71 are both of magnetic material. Hollow sleeve 67 is of course of nonmagnetic material such as brass. When plunger 83 is moved toward cover 73, pad 87 is moved from valve seat 63 and relief outlet is opened. Almost simultaneously, pad 84 closes valve seat 71 and prevents flow of fluid from chamber 21 to chamber 50. As a result the fluid in chamber 50 is free to flow out through outlet 64 and the diaphragm 47 is relieved of the pressure previously exerted and no longer tends to move valve stem 32 downwardly. Washer 42 however is still under pressure of the fluid in chamber 21 which forces stem 32 to move upwardly opening orifice 23 and permitting the fluid to flow from the supply line through chamber 21 and orifice 23 to chamber 22. Valve stem 32 will be maintained in its raised position by the fluid flowing from chamber 21 to chamber 22 until coil 91 is deenergized. Spring 88 will then move plunger 83 to the position illustrated in Figure 1 and the chamber 50 will again be filled with fluid under pressure through valve seat 72. Diaphragm 47 will then exert a downward force on valve stem 32 which will overbalance the upward force exerted on washer 41 and stem 32 will move downwardly again closing orifice 23.

It will be apparent that orifice 23 is normally kept closed by the pressure of the fluid from the supply line itself so that no additional electrical power is needed to maintain the orifice 23 closed. The electrical power needed to open orifice 23 is very small since the orifice of valve seat 72 is comparatively small. The plunger 83 needs only to overcome the resistance of a comparatively weak spring 88 and the force exerted by the fluid on a relatively small area of pad 84 in moving and staying at its actuated position. Valve stem 32 itself is moved upward by the pressure of the fluid coming from the supply line. Moreover, plunger 83 is horizontally slidable and does not have to be lifted each time the coil 91 is energized. It will therefore be evident that the power needed to operate the valve of the invention is very small. By employing a plunger 83 provided with pads 84 and 87 at opposite ends, a very simple and easily assembled mechanism is made possible for opening valve seat 63 and closing valve seat 72, or vice versa, upon one movement of plunger 83.

The various components of the invention are made, wherever possible, of corrosion resistant materials such as brass or stainless steel since they are in contact with such fluids as water or oil and since in some applications e. g. remotely controlled lawn sprinkling systems, the valve is buried in the ground and the space between hollow sleeve 67 and the main portion 70 of housing 54 is filled with an acid and sulphur free oil to prevent condensation and collection of water in this space. Condensation of water would take place due to the variations in temperature which this space is subjected. When coil 91 is energized the temperature is raised and it is lowered when the coil is deenergized. If this space were filled with air, the variations in the pressure of the air caused by variations in temperature would cause some air to leak past the various seals, such as rings 75 and 79. The moisture so introduced would be condensed and would eventually ground terminal post 97 short circuiting coil 91.

Plunger 83 is hexagonally shaped but could be made in any form which would allow passage of fluid between plunger 83 and hollow sleeve 67. For example, plunger 83 could be of substantially round shape and have grooves in its surface providing passages for the fluid.

While there has been described and shown a preferred embodiment of the invention, it will be apparent to those skilled in the art that various changes and modifications may be made without departing from the invention and it is therefore the aim in the appended claim to cover all such changes and modifications as fall within the true spirit and scope of the invention.

What is claimed is:

In combination: a main valve body having an integral cylindrical body, said main valve body being provided with a first and a second chamber; a partition between said chambers provided with a first orifice, said main valve body being provided with an aperture for admitting fluid under pressure to said first chamber, an external flange and an internal flange formed on said cylindrical body defining a circular aperture, a valve stem guide having legs depending through said aperture and an annular flange on its upper end having an annular recess therein adjacent said circular aperture, a valve stem mounted within said main valve body for reciprocatory movement through said circular aperture, one end of said valve stem being adapted to close said first orifice; the pressure of said fluid in said first chamber acting on said valve stem tending to move said valve stem to open said first orifice; a washer in the recess of said flange, resilient means holding said washer against said valve stem, a plate holding said washer against displacement from said recess, means extending through said plate, the flange of said guide and into the internal flange of said cylindrical body to hold said plate in position; a diaphragm connected to the other end of said valve stem; a cover connected to the external flange of said cylindrical body and said diaphragm, said cover and said diaphragm providing a pressure chamber, said diaphragm having an area exposed to the fluid pressure within the pressure chamber which is larger than the area of said first orifice; and means for admitting said fluid under pressure into said pressure chamber, the pressure of said fluid in said pressure chamber acting on said diaphragm tending to move said valve stem to close said first orifice, whereby the valve stem closes said first orifice when said fluid under pressure is admitted to said pressure chamber.

References Cited in the file of this patent

UNITED STATES PATENTS

| | | |
|---|---|---|
| 895,426 | Cable | Aug. 11, 1908 |
| 1,793,252 | Roth | Feb. 17, 1931 |
| 2,217,087 | Whitenack | Oct. 8, 1940 |
| 2,267,515 | Wilcox | Dec. 23, 1941 |
| 2,282,878 | Newton | May 12, 1942 |
| 2,335,923 | Dube | Dec. 7, 1943 |
| 2,368,850 | Lange | Feb. 6, 1945 |
| 2,573,369 | Snoddy | Oct. 30, 1951 |

FOREIGN PATENTS

| | | |
|---|---|---|
| 83,631 | Germany | Oct. 12, 1895 |
| 208,703 | Great Britain | July 10, 1924 |
| 151,789 | Austria | Dec. 10, 1937 |